(12) United States Patent
Mairou et al.

(10) Patent No.: US 8,439,304 B2
(45) Date of Patent: May 14, 2013

(54) ENERGY ABSORBER SYSTEM FOR AN UNDERCARRIAGE, AND AN AIRCRAFT PROVIDED WITH SAID ENERGY ABSORBER SYSTEM

(75) Inventors: Joseph Mairou, Vitrolles (FR); Didier Bertin, Marseilles (FR); Vincent Lassus, Saint Pantaleon (FR); Jean Nicola, Aix-en-Provence (FR)

(73) Assignee: Eurocopter, Marignane Cedex (FR)

( * ) Notice: Subject to any disclaimer, the term of this patent is extended or adjusted under 35 U.S.C. 154(b) by 193 days.

(21) Appl. No.: 13/088,511

(22) Filed: Apr. 18, 2011

(65) Prior Publication Data

US 2011/0260000 A1 Oct. 27, 2011

(30) Foreign Application Priority Data

Apr. 26, 2010 (FR) ..................................... 10 01776

(51) Int. Cl.
*B64C 25/58* (2006.01)
(52) U.S. Cl.
USPC .................... 244/102 A; 244/121; 244/104 R
(58) Field of Classification Search .............. 244/100 R, 244/102 A, 102 SS, 103 R, 104 R, 121
See application file for complete search history.

(56) References Cited

U.S. PATENT DOCUMENTS

| | | | |
|---|---|---|---|
| 1,914,092 A * | 6/1933 | Henrichsen et al. | 244/102 R |
| 2,462,844 A * | 3/1949 | Chalfant et al. | 244/102 R |
| 4,537,374 A * | 8/1985 | Barnoin et al. | 244/102 R |
| 4,540,142 A * | 9/1985 | Veaux et al. | 244/102 R |
| 4,561,612 A * | 12/1985 | Masclet | 244/104 R |
| 7,407,134 B2 * | 8/2008 | Bietenhader | 244/102 A |
| 7,413,140 B2 * | 8/2008 | Bietenhader | 244/17.11 |
| 7,429,019 B1 * | 9/2008 | Bietenhader | 244/102 A |
| 7,575,193 B2 * | 8/2009 | Payen et al. | 244/100 R |
| 2007/0057117 A1 * | 3/2007 | Payen et al. | 244/100 R |
| 2007/0095976 A1 * | 5/2007 | Bietenhader | 244/102 A |
| 2008/0237396 A1 * | 10/2008 | Bietenhader | 244/102 A |

FOREIGN PATENT DOCUMENTS

| | | |
|---|---|---|
| EP | 1717144 A1 | 11/2006 |
| FR | 2684957 A1 | 6/1993 |
| FR | 2885596 A1 | 11/2006 |

OTHER PUBLICATIONS

Search Report and Written Opinion; application No. FR 1001776; dated Jan. 7, 2011.

* cited by examiner

*Primary Examiner* — Philip J Bonzell
(74) *Attorney, Agent, or Firm* — Brooks Kushman P.C.

(57) ABSTRACT

An energy absorber system (10) provided with a shock absorber (11) extending from a first end (12) suitable for being connected to a rocker arm (5) of an undercarriage (3) housed in a wheel bay (4), towards a second end (13). In addition, the system includes a fitting (20) connected to said second end (13), and guide means (30) for guiding said fitting (20) in translation that is suitable for being fastened to a flank (4") of said wheel well (4), said system (10) including deformable energy absorber means (40) fastened to said fitting (20) and suitable for being fastened to a structure (4") of said bay (4) and also to fusible retention means (50) suitable for fastening said fitting (20) to said flank (4"), said fusible retention means (50) rupturing from a predetermined threshold in order to allow said fitting (20) to move under guidance from said guide means (30) so as to deform said energy absorber means (40).

22 Claims, 4 Drawing Sheets

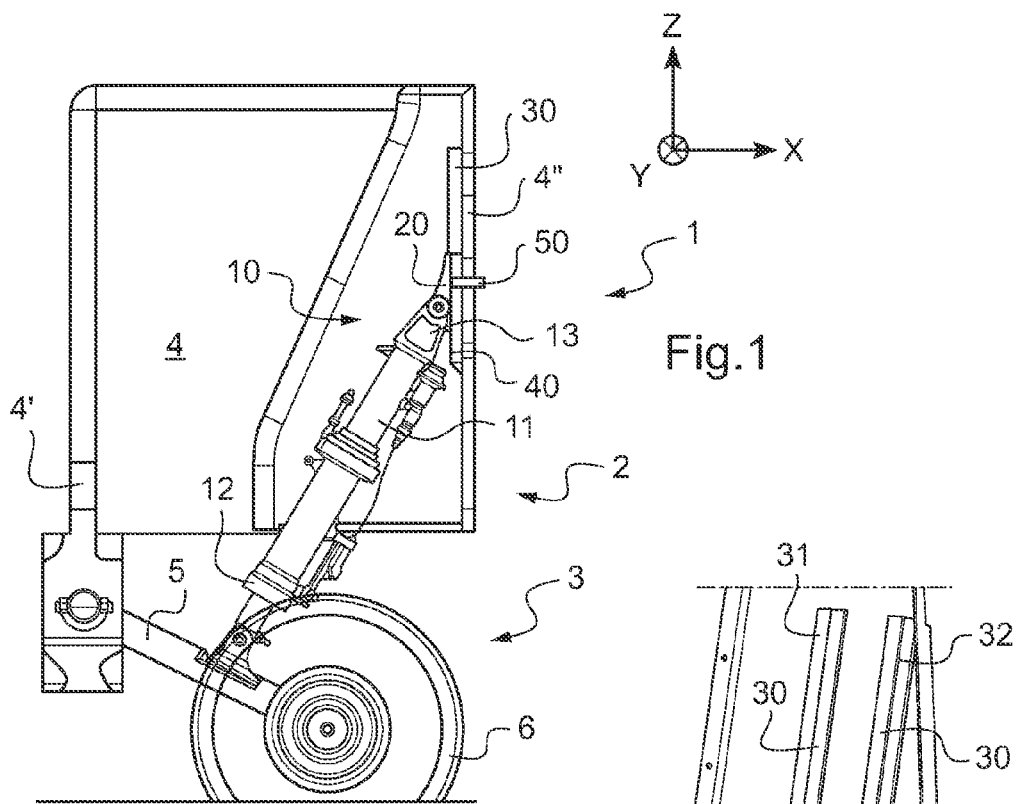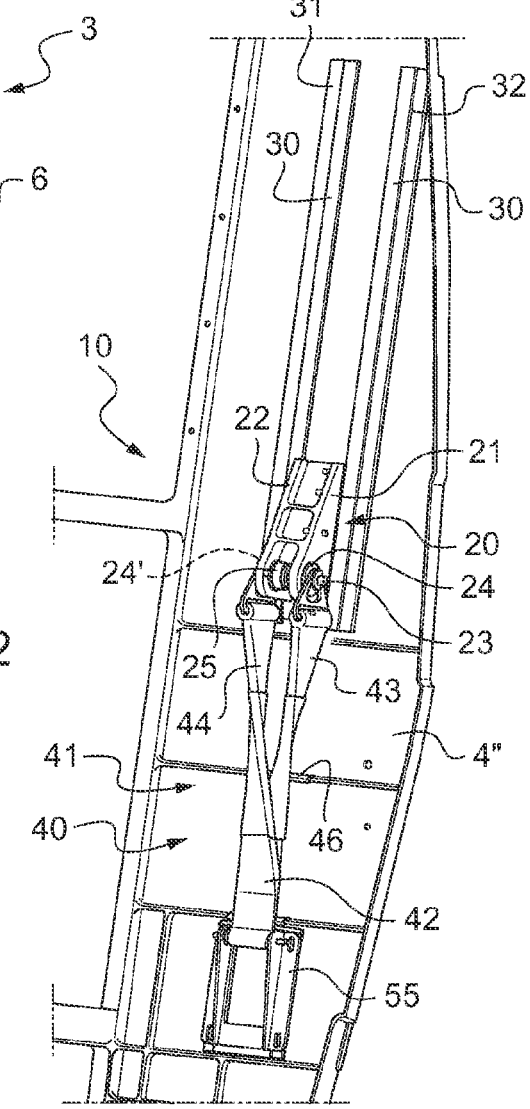

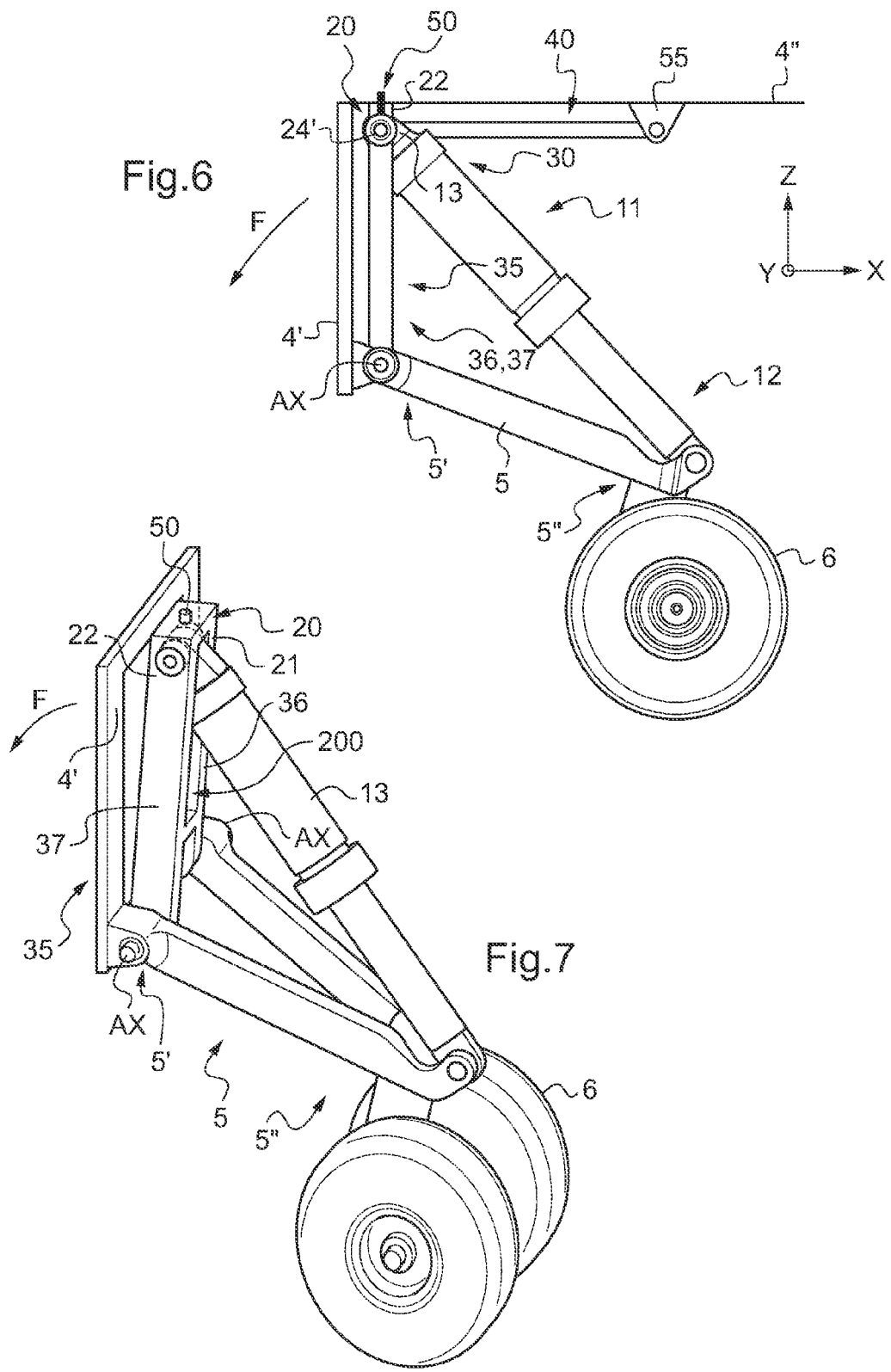

ENERGY ABSORBER SYSTEM FOR AN UNDERCARRIAGE, AND AN AIRCRAFT PROVIDED WITH SAID ENERGY ABSORBER SYSTEM

CROSS REFERENCE TO RELATED APPLICATIONS

This application claims the benefit of FR 10 01776 filed on Apr. 26, 2010, the disclosure of which is incorporated in its entirety by reference herein.

BACKGROUND OF THE INVENTION (1) Field of the Invention

The present invention relates to an energy absorber system for an undercarriage, and to an aircraft provided with said energy absorber system.

(2) Description of Related Art

Conventionally, an aircraft has landing gear via which it stands on the ground. For example, the landing gear may be provided with three or four wheeled undercarriages constituting a support polygon for the aircraft on the ground. Undercarriages are also known that are provided with skids.

Such undercarriages may be retractable in order to improve the aerodynamic drag of the aircraft. The most pre-eminent elements of the aircraft are folded into the inside of the fuselage, in particular when retractable landing gear is used. More precisely, while in flight, each undercarriage is retracted into a compartment that is conventionally referred to as a "wheel bay", so as to be ready for deploying at the appropriate moment while landing.

Civil certification regulations, e.g. known under the acronyms "FAR", "JAR", or "EASA-CS" (short for European Aviation Safety Agency Certification Specification) require undercarriages to present certain levels of dynamic energy absorption.

Thus, according to those civil certification regulations, for an aircraft having a first predetermined vertical speed on impact with the ground, an undercarriage must be capable of absorbing the kinetic energy of the impact without suffering any permanent deformation of the components making up the undercarriage, with this being required for various attitudes of the aircraft while landing, and for the most unfavorable weight and centering conditions. Similarly, when the aircraft presents a second predetermined vertical impact speed against the ground that is greater than the first speed, each undercarriage must absorb the kinetic energy of the impact without rupturing the components making up the undercarriage, with this being required for various attitudes of the aircraft while landing, and for the most unfavorable weight and centering conditions.

Under such circumstances, an undercarriage that complies with civil certification regulations is referred to for convenience as a "standard" undercarriage, and it often includes a shock absorber of a first type, referred to, for convenience, as a "first" shock absorber.

For example, a standard undercarriage may be provided with a rocker arm extending from a first end zone towards a second end zone supporting one or more wheels, the first end zone being hinged to a first flank of a wheel bay.

Furthermore, the undercarriage includes an energy absorber system provided with a first shock absorber of the oleopneumatic type. The first shock absorber is hinged firstly to the rocker arm and secondly to a second flank of the wheel bay. The first shock absorber may be substantially vertical, i.e. directed in a direction that is substantially perpendicular to the ground when the aircraft is standing on the ground, and substantially parallel to the first and second flanks. This position of the shock absorber may nevertheless be oriented in some other way (i.e. non-vertical) for reasons of integration and/or compatibility with the structure to which it is to be connected.

One such first shock absorber comprises a piston sliding in a main cylinder having a head that is in contact with a first chamber that is filled with oil and that is fitted with throttling orifices serving to absorb energy during a landing. In addition, the shock absorber has a second chamber filled with gas in order to support the aircraft in a static situation. The second chamber communicates with the first chamber, the second chamber having a volume that is reduced when the first shock absorber is compressed in order to contribute to absorbing energy during a landing.

The first shock absorber may optionally also enable the rocker arm to be retracted into the wheel bay.

Document FR 2 684 957 describes such a standard undercarriage.

Those standard undercarriages are most effective and they serve to satisfy the requirements of civil certification regulations.

Nevertheless, it can be understood that standard undercarriages are sometimes not adapted to vertical ground impact speeds that are greater than the speeds defined by the civil regulations.

Furthermore, in addition to civil certification regulations, there exist military qualification regulations known for example under the name "MIL-STD-8698", naval qualification requirements known for example under the name "AR56", and military crash qualification requirements known for example under the name "MIL-STD-1290", which are more severe than civil certification regulations.

These military and naval qualification regulations "MIL-S-8698" and "AR56" impose vertical speeds that are greater than the above-mentioned first and second vertical speeds. The military crash qualification regulations "MIL-STD-1290" impose even greater vertical speeds than those mentioned above and they define the behavior of undercarriages in terms of energy absorption and integrity up to the fuselage making contact with the ground.

Undercarriages adapted to military, naval, and military crash qualification regulations are referred to for convenience as "high energy absorption" undercarriages. By way of example, a high energy absorption undercarriage differs from a standard undercarriage by often including an energy absorber system that is provided with a shock absorber of a second type, that is referred to for convenience as a "second" shock absorber. That second shock absorber is provided with a piston having an available stroke that is longer than the stroke of a first shock absorber of a standard undercarriage.

Furthermore, a second shock absorber of a high energy absorption undercarriage may, in particular, have multiple chambers filled with gas and varying throttling orifices.

The second shock absorber of a high energy absorption undercarriage is therefore often bulkier, heavier, and more expensive than the first shock absorber of a standard undercarriage.

Control of the forces generated by the second shock absorber may be incorporated in a first shock absorber via multiple or varying throttling orifices without significant penalty in terms of cost or weight. However, the long stroke of the piston gives rise to an increase in the size of the wheel bay and to the attachment points of the shock absorber being further away, thereby giving rise to large amounts of extra cost and weight. Furthermore, increasing the size of the wheel bay is not always possible for reasons of integration and/or compatibility with other items of equipment.

It should be observed that document FR 2 885 596 presents an undercarriage having a rocker arm and brake means for the rocker arm.

SUMMARY OF THE INVENTION

An object of the present invention is thus to propose an undercarriage energy absorber system that presents minimized size and that is adapted to vertical ground impact speeds that are greater than or equal to the speeds defined by civil certification regulations.

According to the invention, an energy absorber system is provided with a shock absorber extending from a first end suitable for being connected to a rocker arm of an undercarriage housed in a wheel bay, towards a second end. This energy absorber system is remarkable in that it includes a fitting connected to the second end, and guide means for guiding the fitting, the energy absorber system including deformable energy absorber means fastened to the fitting and suitable for being fastened to a structure of the bay and also to fusible retention means suitable for fastening the fitting to a flank of the bay, the fusible retention means rupturing from a predetermined threshold in order to allow the fitting to move under guidance from the guide means so as to deform the energy absorber means.

Thus, it is possible to use a shock absorber of the first type and to obtain performance that is better than that of the performance required by civil certification regulations, without significantly modifying the wheel bay.

Below the predetermined threshold, the fusible retention means retain the fitting in a rest position. The energy absorber system then operates like an energy absorber system of a standard undercarriage. In contrast, above said predetermined threshold, i.e. above a predefined vertical impact speed greater than the second vertical speed, and possibly equal to 4 meters per second (m/s), the fusible retention means yield and release the fitting. The fitting then moves under guidance of the guide means and exerts a force on the deformable energy absorber means. The deformation of the deformable energy absorber means then absorbs the energy that results from the impact.

In other aspects, the invention may include at least one of the following additional characteristics.

In a first embodiment, the fitting moves in translation along a straight line after the fusible retention means have ruptured.

In a preferred first variant of the first embodiment, said guide means comprise two slide rails co-operating with a movable shoe of the fitting. The adjective "movable" relates to the shoe of the fitting insofar as the shoe of the fitting slides between the two slide rails of the guide means when the fusible retention means rupture.

Furthermore, the retention means are fastened firstly to the fitting and secondly to the flank. For example, the retention means may comprise a peg that is secured to the fitting and that passes through an orifice in the flank in order to be fastened thereto, e.g. by screw-fastener means. The peg then has a zone of weakness so as to rupture beyond said predetermined threshold, the zone of weakness optionally having a section of dimensions that are smaller than the dimensions of other sections of the peg.

The retention means may include a riveted plate of dimensions suitable for enabling said plate or the rivets holding the plate to yield as from said predetermined threshold.

In an alternative second variant of the first embodiment, the guide means comprise a T-shaped stationary guide rail suitable for being fastened to a flank of a wheel bay and co-operating with a movable slide shoe of the fitting. The adjective "stationary" is associated with the T-shaped guide rail insofar as, in this second variant of the first embodiment, it is the slide shoe that moves relative to the rail when the fusible retention means yield.

It should be observed that since the stationary rail is fastened to the wheel bay, the retention means may be fastened both to the fitting and to the stationary rail.

For example, the retention means may be a peg secured to the rail and passing through an orifice in the fitting in order to be fastened thereto by screw-fastener means, for example. Like the first embodiment as described above, the peg may then include a zone of weakness so as to rupture beyond said predetermined threshold.

As a result, the first variant of the first embodiment implements two stationary slide rails secured to a panel of the wheel bay and a movable shoe secured to the fitting, whereas conversely, the second variant of the first embodiment implements a stationary rail secured to the panel of the wheel bay and a movable slide shoe secured to the fitting.

In a second embodiment, the fitting performs pivoting movement.

Under such circumstances, the guide means comprise connection means extending the fitting, the connection means being hinged to a pivot pin that is suitable for being connected to the rocker arm, the retention means being fastened both to the fitting and to the flank. The pivot pin may also be a pin about which the rocker arm pivots, the pivot pin being implemented as a single member or as a plurality of members.

Furthermore, whatever the embodiment, the fitting may optionally have two fastener cheekplates, with the second end of the shock absorber being located between the cheekplates, a fastener pin passing through said cheekplates and the second end. Advantageously, the shock absorber includes a ball joint fastened between said cheekplates by the fastener pin.

Under such circumstances, the deformable energy absorber means may be fastened to the fastener pin.

Furthermore, the deformable energy absorber means optionally comprise at least one strap, the strap absorbing the energy that results from the impact by tearing its stitching, for example. The strap may be made of composite material.

In a variant, the strap is Y-shaped, having a bottom branch suitable for being fastened to a structure, such as the flank of the wheel bay to which the fitting is fastened. This bottom branch is then extended by two top branches that are fastened to the fitting, e.g. on either side of a fastener pin of the fitting serving to secure the second end of the shock absorber.

In another variant, the deformable energy absorber means comprise two straps, for example.

In addition to an energy absorber system, the invention also provides an aircraft provided with landing gear including at least one undercarriage located in a wheel bay, the undercarriage having a rocker arm hinged to a wall of the wheel bay and supporting at least one contact member, the undercarriage having an energy absorber system provided with a shock absorber extending from a first end connected to the rocker arm towards a second end. The energy absorber system is then an energy absorber of the invention as described above.

Thus, the energy absorber system includes in particular a fitting connected to the second end and guide means for guiding the fitting in translation and fastened to a flank of the wheel bay, the energy absorber system thus including deformable energy absorber means connecting the fitting to a structure of the wheel bay and fusible retention means fastening the fitting to the flank either directly or else indirectly via a stationary rail arranged on the flank, the fusible retention means rupturing above a predetermined threshold in order to allow the fitting to slide relative to the guide means, thereby deforming the energy absorber means.

BRIEF DESCRIPTION OF THE DRAWINGS

The invention and its advantages appear in greater detail from the following description of embodiments given by way of illustration with reference to the accompanying figures, in which:

FIG. 1 is a view of an aircraft provided with an energy absorber system in a first embodiment of the invention;

FIG. 2 is a view showing said energy absorber system of the first embodiment;

FIGS. 6 and 7 are views showing said energy absorber system in a second embodiment.

DETAILED DESCRIPTION OF THE PREFERRED EMBODIMENTS

Figure 3:
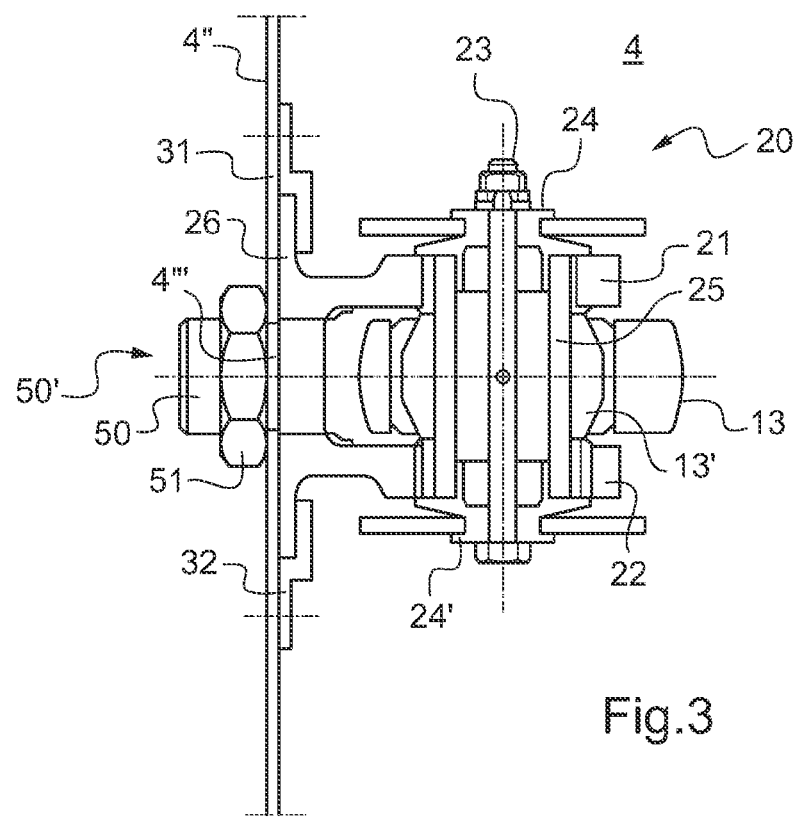
FIG. 3 is a section view showing a first variant of the first embodiment.

Elements present in more than one of the figures are given the same references in each of them.

FIGS. 1 to 5 show a first embodiment of the invention.

FIG. 1 shows an aircraft 1 provided with landing gear 2 comprising at least one undercarriage 3 arranged in a wheel bay 4.

It should be observed that three mutually orthogonal axes X, Y, and Z are shown in FIG. 1.

The X axis is said to be longitudinal. The term "length" is used relative to a longitudinal dimension of the device along said longitudinal X axis.

Another axis, Y, is said to be transverse. The term "width" is used relative to a transverse dimension of the device along said transverse axis.

Finally, a third axis, Z, is said to be in elevation and it corresponds to height dimensions of the structures described. The term "thickness" then relates to an elevation dimension of the device along said elevation axis.

A first plane, XY, is said to be "horizontal" and second and third planes, YZ and XZ, are said to be "vertical".

The undercarriage 3 comprises a rocker arm 5 supporting a contact member 6 such as a wheel or a skid for example, the rocker arm being hinged to a vertical wall 4' extending parallel to the second plane YZ in order to define the wheel bay 4.

The undercarriage 3 then includes an energy absorber system 10 in particular for absorbing the kinetic energy of the aircraft 1 during a landing.

The energy absorber system 10 is provided with a shock absorber 11 extending from a first end 12 towards a second end 13, the first end being hinged to the rocker arm 5. More precisely, the first end is arranged between the first end zone of the rocker arm 5 that is hinged to the wall 4' and the second end zone of the rocker arm 5 that supports the contact member 6.

The shock absorber is arranged substantially vertically along an axis parallel to the elevation Z axis, i.e. substantially parallel to the wall 4'. Nevertheless, the shock absorber 11 could be horizontal and substantially parallel to the longitudinal X axis.

By way of example, the shock absorber is an oleopneumatic shock absorber of the above-described first type, optimized by the presence of varying or multiple throttling orifices.

In addition, the energy absorber system 10 includes fastener means for fastening the second end 13 of the shock absorber 11 to the aircraft 1, and in particular to the members that define the wheel bay 4. The energy absorber system 10 is provided with a fitting 20, and the second end 13 is hinged to said fitting 20.

The fitting 20 co-operates with guide means 30 for guiding it in translation and fastened to a flank 4" of the wheel bay 4, the flank 4" being parallel to the wall 4' and parallel to the second plane YZ. It should be observed that the flank 4" may be substantially parallel to the first plane XY or to the third plane XZ, without going beyond the ambit of the invention.

In addition, the fitting 20 co-operates with deformable energy absorber means 40 fastened to a structure of the wheel bay 4. By way of example, this structure may be the flank 4" of the wheel bay 4 or some other member of the wheel bay 4.

Furthermore, fusible retention means 50 hold the fitting 20 in a rest position below some predetermined threshold, e.g. a speed of 4 m/s. The retention means 50 thus lock the fitting 20 geometrically in a rest position by fastening said fitting 20 to the flank 4", either directly, i.e. without any intermediate member, or else indirectly by using at least one intermediate member.

As from the predetermined threshold, the fusible retention means 50 rupture and release the fitting, which then slides relative to the flank 4", being guided by the guide means 30. During this movement in translation, the fitting 20 exerts a force on the deformable energy absorber means 40, said deformable energy absorber means 40 possibly being a metal member that stretches or indeed a strap that becomes unstitched, for example.

The retention means 50 as shown comprise a pin. Nevertheless, they could comprise, for example, rivets that hold the fitting in reversible manner, with the rivets rupturing as from a determined threshold. Such rivets may co-operate directly with the fitting or via an intermediate plate, for example.

FIG. 2 shows the fastener means of the energy absorber system 10.

The fitting has first and second lateral fastening cheekplates 21 and 22 defining an inner space suitable for receiving the hinge at the second end 13 of the shock absorber 11.

For this purpose, the fitting 20 possesses a bushing 25 extending from the first cheekplate 21 to the second cheekplate 22, two spools 24 and 24' being pressed against opposite ends of the bushing 25.

To fasten the shock absorber 11, and with reference to FIG. 3, the second end of the shock absorber 11 is placed between the first and second cheekplates 21 and 22, and then the bushing 25 is passed successively through the first cheekplate 21, an orifice in a ball joint at the second end, and then the second cheekplate 22.

Thereafter, the first and second spools 24 and 24' are positioned respectively against the first cheekplate 21 and against the second cheekplate 22, the bushing 25 being clamped between these first and second spools 24. Thereafter a fastener pin 23 is used to terminate assembly. The fastener pin thus passes through the first spool 24, the first cheekplate 21, the bushing 25, the second end 13, the second cheekplate 22, and the second spool 24'.

With reference to FIG. 2, the energy absorber means 40 are fastened firstly to the flank 4" by attachment means 55 and secondly to the fitting 20. More precisely, the energy absorber means 40 are fastened to the fastener pin 23 by being attached to the first and second spools 24 and 24' in the example shown. Nevertheless, the energy absorber means 40 could be fastened to other members of the fitting.

The energy absorber means 40 shown diagrammatically comprise a strap 41, optionally made of composite materials, but it could have other characteristics, for example it could be a metal member having a zigzag shape, for example. The strap 41 is Y-shaped so as to possess a bottom branch 42 that is secured to the attachment means 55, said bottom branch 42 being extended firstly by a first top branch 43 that is fastened to the fastener pin 23 by the first spool 24, and secondly by a second top branch 44 that is fastened to the fastener pin 23 by the second spool 24'.

FIGS. 2 and 3 show a first variant of a first embodiment of the guide means 30.

In this first variant of the first embodiment, the guide means 30 include a stationary first slide rail 31 and a stationary second slide rail 32. The first and second slide rails 31 and 32 are said to be "stationary" insofar as the first and second slide rails 31 and 32 are not in a position to move. The first and second stationary slide rails 31 and 32 are secured to the flank 4" by conventional securing means, i.e. by welding, adhesive bonding, or indeed screw fastening, for example.

With reference to FIG. 3, the fitting 20 then includes a movable shoe 26 engaged in the first and second slide rails 31 and 32. The shoe 26 is said to be "movable" insofar as it is suitable for sliding relative to the first and second stationary slide rails 31 and 32.

Furthermore, the fusible retention means 50 are secured to the fitting 20. The retention means 50 possess a peg that has a threaded portion 50' passing through an orifice 4''' in the flank 4", with a nut being screwed onto said threaded portion 50'. In its rest position, the fitting is thus held stationary by being fastened to the flank 4" directly by means of the peg of the fusible retention means 50.

Other embodiments are possible, such as fusible rivets connecting the fitting (with an extension) to a wall. It is possible for a single metal part to include a local zone of weakness that acts as a fuse.

Figure 4:
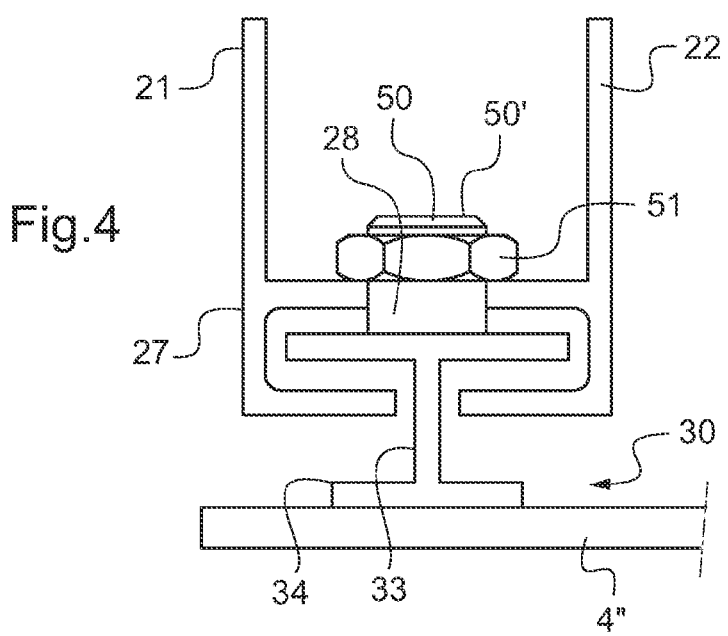
FIG. 4 is a diagram showing a second variant of the first embodiment.

FIG. 4 shows a second variant of the first embodiment. In this second variant of the first embodiment, the guide means comprise a T-shaped stationary guide rail 33 fastened via a base 34 to the flank 4". The assembly comprising the stationary guide rail 33 and its base 34 is thus H-shaped, said assembly possibly being made as a single piece and fastened to the flank 4" by conventional connection means. Nevertheless, the stationary guide rail could also be welded to the flank 4" in which case it would not require a base to be used.

The rail 33 is said to be "stationary" insofar as the stationary guide rail is not in a position to move once it is fastened to the flank 4".

The fitting 20 then possesses a movable slide shoe 27 that co-operates with the stationary guide rail 33.

Furthermore, in this embodiment, the fitting 20 may be fastened indirectly to the flank 4" via the stationary guide rail 33.

For example, a retention means pin 50 is secured to the stationary rail 33, with a threaded portion 50' passing through an orifice 28 in the fitting and with a nut being screwed onto said threaded portion 50'. In its rest position, the fitting is thus blocked by being fastened to the flank 4" indirectly by the peg of the fusible retention means 50.

Figure 5:
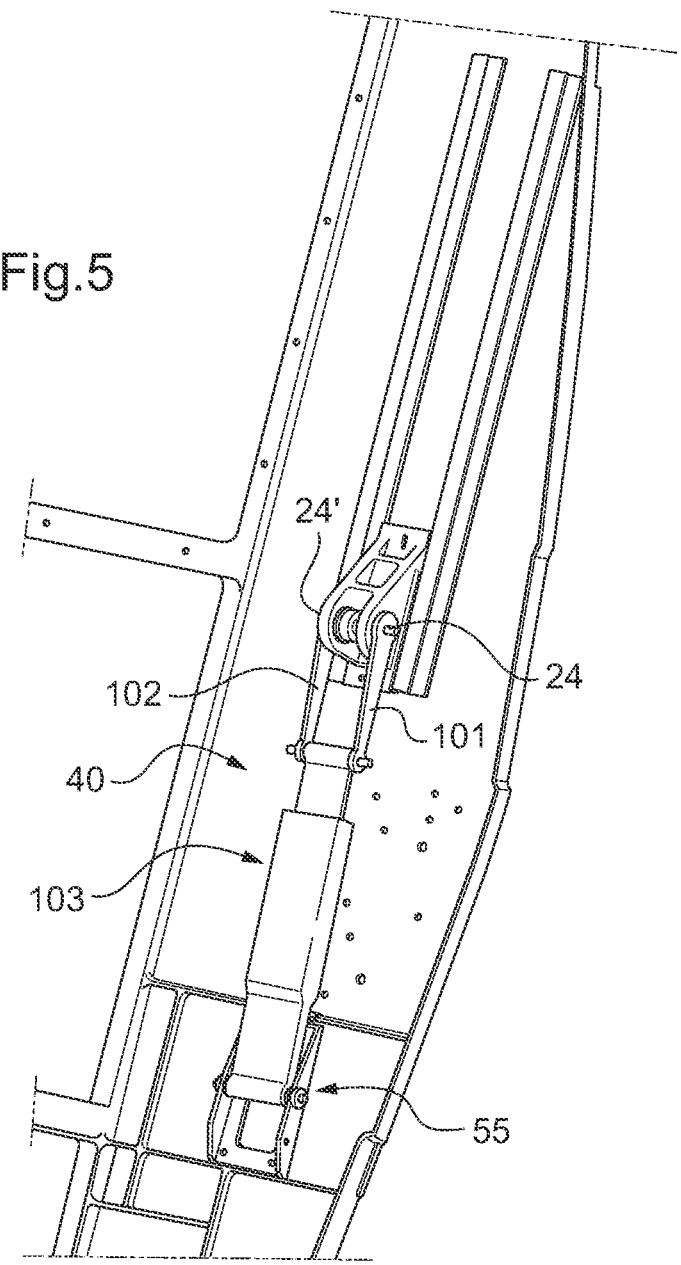
FIG. 5 is a view showing a variant of the energy absorber means.

FIG. 5 shows energy absorber means 40 provided with two links 101 and 102 that are fastened to the fastener pin 23 respectively by the first spool 24 and by the second spool 24'.

In addition, the links 101 and 102 are fastened to the attachment means 55 via a strap 103 shown in FIG. 5. Thus, the strap is fastened firstly to the attachment means by a first pin and secondly to the links 101 and 102 by a second pin.

FIGS. 6 to 7 show a second embodiment in which the fitting 20 no longer moves in longitudinal translation as a result of the retention means 50 rupturing, but rather in rotation about the pivot pin AX of the rocker arm.

With reference to FIGS. 6 and 7, the rocker arm extends from a first end zone 5' to a second end zone 5".

The first end zone 5' is then hinged to a pivot pin AX of the wall 4' so as to be capable of pivoting about said pivot pin AX. It should be observed in FIG. 7 that the rocker arm may comprise two arms that are hinged to two distinct pivot pin members AX.

The second end zone 5" carries the contact member(s) 6, said second end zone 5" also being fastened to the first end 12 of the shock absorber 11.

In accordance with the first embodiment, the second end 13 of the shock absorber is fastened to a fitting 20 via the above-described means, for example, said fitting 20 being reversibly fastened to a flank 4" by retention means 50 such as a fusible peg 50. It should be observed that the flank 4" is parallel to the first plane XY.

Furthermore, the energy absorber system is provided with deformable energy absorber means 40 fastened to the fitting 20 and to a structure 4" of the wheel bay 4. This energy absorber means 40 may possess one or more straps of the above-described type, for example.

Furthermore, the energy absorber system is provided with guide means 30 for guiding the fitting 20 in rotary movement as shown by arrow F in the event of the fusible retention means 50 rupturing, e.g. the peg shown diagrammatically. These guide means 30 comprise connection means 35 extending the fitting 20, the connection means 35 being hinged to the pivot pin AX.

The fitting 20 is provided with a base including the peg of the retention means 50 and two cheekplates 21 and 22, and the connection means 35 may possess two arms 36 and 37 extending the cheekplates 21 and 22 respectively, these arms being welded to the cheekplates or being formed integrally with said cheekplates, for example. Each arm is then both secured to one of the cheekplates and hinged to the pivot pin AX.

With reference to FIG. 7, in order to enable the fitting 20 to pivot as shown by arrow F, the wall 4' includes a through orifice 4'''. It should be observed that this through orifice may be closed by a tearable web, the web then contributing to absorb energy by opposing the passage of elements situated in the wheel bay through the wall 4', for example.

Consequently, from the predetermined threshold, the fusible retention means 50 rupture and release the fitting which pivots about the pivot axis AX while being guided by the guide means 30. While it pivots, the fitting 20 exerts a force on the deformable energy absorber means 40. Furthermore, in the wall 4', the fitting 20 tears the web 200 in order to continue its pivoting movement.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

For example, it is possible to envisage replacing the links 101 and 102 shown in the FIG. 5 variant by deformable means, or even by straps. Similarly, the strap 103 may then be replaced by deformable means or indeed by conventional connection means.

What is claimed is:

1. An energy absorber system provided with a shock absorber extending from a first end connected to a rocker arm of an undercarriage housed in a wheel bay, towards a second end, wherein the system includes a fitting connected to said second end, and guide means for guiding said fitting, said energy absorber system including deformable energy absorber means fastened to said fitting and fastened to a structure of said bay and also to fusible retention means fastening said fitting to a flank of said bay, said fusible retention means rupturing from a predetermined threshold in order to allow said fitting to move under guidance from said guide means so as to deform said energy absorber means, said guide means comprising at least one guide rail.

2. An energy absorber system according to claim 1, wherein said guide means comprise two slide guide rails co-operating with a movable shoe of said fitting.

3. An energy absorber system according to claim 1, wherein said retention means are fastened firstly to said fitting and secondly to said flank.

4. An energy absorber system according to claim 1, wherein said guide means comprise connection means extending said fitting, said connection means being hinged to a pivot pin that is suitable for being connected to said rocker arm, said retention means being fastened both to said fitting and to said flank.

5. An aircraft provided with landing gear including at least one undercarriage located in a wheel bay, said undercarriage having a rocker arm hinged to a wall of the wheel bay and supporting at least one ground contact member, said undercarriage having an energy absorber system provided with a shock absorber extending from a first end connected to said rocker arm towards a second end, wherein said energy absorber system is according to claim 1.

6. An energy absorber system according to 1, wherein said guide means guides said fitting in rotary movement if said fusible retention means ruptures, and wherein said guide means comprises two arms.

7. An energy absorber system according to claim 1, wherein said guide means comprise a T-shaped stationary guide rail suitable for being fastened to said flank and co-operating with a slide shoe of said fitting.

8. An energy absorber system according to claim 7, wherein said retention means are fastened firstly to said fitting and secondly to said stationary guide rail.

9. An energy absorber system according to claim 1, wherein said fitting has two fastener cheekplates, and said second end is located between said cheekplates, a fastener pin passing through said cheekplates and said second end.

10. An energy absorber system according to claim 9, wherein said deformable energy absorber means are fastened to said fastener pin.

11. An energy absorber system according to claim 1, wherein said deformable energy absorber means comprises at least one strap.

12. An energy absorber system according to claim 11, wherein said strap is Y-shaped, having a bottom branch suitable for being fastened to said structure and two top branches fastened to said fitting.

13. An energy absorber system provided with a shock absorber extending from a first end connected to a rocker arm of an undercarriage housed in a wheel bay, towards a second end, wherein the system includes a fitting connected to said second end, and a guide for guiding said fitting, said energy absorber system including a deformable energy absorber fastened to said fitting and fastened to a structure of said bay and also to a fusible retainer fastening said fitting to a flank of said bay, said fusible retainer rupturing from a predetermined threshold in order to allow said fitting to move under guidance from said guide so as to deform said energy absorber, said guide comprising at least one guide rail.

14. An energy absorber system according to claim 13, wherein said guide comprises two slide guide rails co-operating with a movable shoe of the fitting.

15. An energy absorber system according to claim 13, wherein said guide rail comprises a T-shaped stationary guide rail suitable for being fastened to said flank and co-operating with a slide shoe of said fitting, and wherein said retainer is fastened firstly to said fitting and secondly to said stationary guide rail.

16. An energy absorber system according to claim 13, wherein said retainer is fastened firstly to said fitting and secondly to said flank.

17. An energy absorber system according to claim 13, wherein said guide comprises a connector extending said fitting, said connector being hinged to a pivot pin that is suitable for being connected to said rocker arm, said retainer being fastened both to said fitting and to said flank.

18. An energy absorber system according to claim 13, wherein said fitting has two fastener cheekplates, and said second end is located between said cheekplates, a faster pin passing through said cheekplates and said second end, and wherein said deformable energy absorber is fastened to said faster plates.

19. An aircraft provided with landing gear including at least one undercarriage located in a wheel bay, said undercarriage having a rocker arm hinged to a wall of the wheel bay and supporting at least one ground contact member, said undercarriage having an energy absorber system provided with a shock absorber extending from a first end connected to said rocker arm towards a second end, wherein said energy absorber system is according to claim 13.

20. An energy absorber system according to 13, wherein said guide guides said fitting in rotary movement if said fusible retention means ruptures, and wherein said guide means comprises two arms.

21. An energy absorber system according to claim 13, wherein said deformable energy absorber comprises at least one strap.

22. An energy absorber system according to claim 21, wherein said strap is Y-shaped, having a bottom branch suitable for being fastened to said structure and two top branches fastened to said fitting.

* * * * *